United States Patent
Otani et al.

(10) Patent No.: US 9,916,614 B2
(45) Date of Patent: Mar. 13, 2018

(54) PRODUCT DISPLAY RACK SYSTEM, PRODUCT DISPLAY RACK METHOD, AND PRODUCT DISPLAY RACK PROGRAM

(71) Applicant: Hitachi Systems, Ltd., Shinagawa-ku, Tokyo (JP)

(72) Inventors: Yoshinori Otani, Kyoto (JP); Kiyoshi Kanai, Tokyo (JP); Noriho Tanaka, Tokyo (JP); Yoshinori Tanaka, Tokyo (JP); Hirofumi Tsutsumimoto, Tokyo (JP)

(73) Assignee: Hitachi Systems, Ltd., Shinagawa-ku, Tokyo (JP)

( * ) Notice: Subject to any disclaimer, the term of this patent is extended or adjusted under 35 U.S.C. 154(b) by 405 days.

(21) Appl. No.: 14/438,983

(22) PCT Filed: Aug. 28, 2013

(86) PCT No.: PCT/JP2013/072972
§ 371 (c)(1),
(2) Date: Aug. 28, 2015

(87) PCT Pub. No.: WO2014/045816
PCT Pub. Date: Mar. 27, 2014

(65) Prior Publication Data
US 2016/0055566 A1  Feb. 25, 2016

(30) Foreign Application Priority Data
Sep. 24, 2012  (JP) .................................. 2012-209663

(51) Int. Cl.
*G06Q 30/06* (2012.01)
*G06Q 30/02* (2012.01)
*G06K 7/10* (2006.01)

(52) U.S. Cl.
CPC ...... *G06Q 30/0631* (2013.01); *G06K 7/10415* (2013.01); *G06Q 30/02* (2013.01); *G06Q 30/0201* (2013.01); *G06Q 30/06* (2013.01)

(58) Field of Classification Search
CPC .......... G06K 7/10128; G06Q 30/0631; G06Q 30/0639
See application file for complete search history.

(56) References Cited

U.S. PATENT DOCUMENTS

2008/0215427 A1  9/2008  Kawada et al.

FOREIGN PATENT DOCUMENTS

| CN | 101604333 A | 12/2009 |
| CN | 102167209 A | 8/2011 |

(Continued)

OTHER PUBLICATIONS

Korean Office Action for related Korean Application No. 10-2015-7010426 dated Jun. 1, 2016 and English Translation thereof.
(Continued)

*Primary Examiner* — Christle I Marshall
(74) *Attorney, Agent, or Firm* — McCormick Paulding & Huber LLP

(57) ABSTRACT

To guide other products related to a product which is taken out in hand by a customer. The present product display rack system carries out a first step for detecting an RFID number of a product taken by a customer from desired display racks 11 to 14 based upon the detection result of the RFID reader; a second step for acquiring RFID numbers of related products having related product types and functional types relative to the product type of the RFID number from the product related information data base 260 by using the detected RFID number as a key; a third step for acquiring the product display coordinates of the product type from the product coordinate data base 250 by using the acquired
(Continued)

RFID number of the related product as a key; and a fourth step for lighting or flickering the lamp of the lamp guiding units 30 to 33 at a position close to the acquired product display coordinates.

20 Claims, 9 Drawing Sheets

(56) References Cited

FOREIGN PATENT DOCUMENTS

| | | |
|---|---|---|
| JP | 2007-115152 A | 5/2007 |
| JP | 2007-241806 A | 9/2007 |
| JP | 2008-27330 A | 2/2008 |
| JP | 2008-90745 A | 4/2008 |
| JP | 2009-199517 A | 9/2009 |
| JP | 2011-96023 A | 5/2011 |
| JP | 2012-38035 A | 2/2012 |

OTHER PUBLICATIONS

International Search Report for corresponding application No. PCT/JP2013/072972 dated Sep. 12, 2013.
Singaporean Written Opinion for Singapore Application No. 11201504025T dated Mar. 7, 2016.
Chinese Office Action for related Chinese Application No. 2013800611013 dated Apr. 28, 2017 and its English Translation.

FIG. 2A

| COMPANY NAME | SERIES | | SKIN CARE | | | |
|---|---|---|---|---|---|---|
| | | | CLEANSING MATERIAL | FACE-WASHING MATERIAL | COSMETIC LOTION | MILKY LOTION |
| A COMPANY | ROSE SERIES | DRY SKIN-USE | A11 | A21 | A31 | A41 |
| | | NORMAL SKIN-USE | A15 | A25 | A35 | A45 |
| | | OILY SKIN-USE | A18 | A28 | A38 | A48 |
| | LILY SERIES | DRY SKIN-USE | A12 | A22 | A32 | A42 |
| | | NORMAL SKIN-USE | A16 | A26 | A36 | A46 |
| | | OILY SKIN-USE | A19 | A29 | A39 | A49 |

FIG. 2B

| COMPANY NAME | SERIES | | SKIN CARE | | | |
|---|---|---|---|---|---|---|
| | | | CLEANSING MATERIAL | FACE-WASHING MATERIAL | COSMETIC LOTION | MILKY LOTION |
| B COMPANY | PLATINUM SERIES | DRY SKIN-USE | B11 | B21 | B31 | B41 |
| | | NORMAL SKIN-USE | B15 | B25 | B35 | B45 |
| | | OILY SKIN-USE | B18 | B28 | B38 | B48 |
| | SILVER SERIES | DRY SKIN-USE | B12 | B22 | B32 | B42 |
| | | NORMAL SKIN-USE | B16 | B26 | B36 | B46 |
| | | OILY SKIN-USE | B19 | B29 | B39 | B49 |

FIG. 2C

| COMPANY NAME | SERIES | | SKIN CARE | | | |
|---|---|---|---|---|---|---|
| | | | CLEANSING MATERIAL | FACE-WASHING MATERIAL | COSMETIC LOTION | MILKY LOTION |
| C COMPANY | WHITE SERIES | DRY SKIN-USE | C11 | C21 | C31 | C41 |
| | | NORMAL SKIN-USE | C15 | C25 | C35 | C45 |
| | | OILY SKIN-USE | C18 | C28 | C38 | C48 |
| | PINK SERIES | DRY SKIN-USE | C12 | C22 | C32 | C42 |
| | | NORMAL SKIN-USE | C16 | C26 | C36 | C46 |
| | | OILY SKIN-USE | C19 | C29 | C39 | C49 |

FIG. 3

| FUNCTION | MAKER | SERIES | SKIN CARE | | | |
|---|---|---|---|---|---|---|
| | | | CLEANSING MATERIAL | FACE-WASHING MATERIAL | COSMETIC LOTION | MILKY LOTION |
| DRY SKIN-USE | A COMPANY | ROSE SERIES | A11 | A21 | A31 | A41 |
| | | LILY SERIES | A12 | A22 | A32 | A42 |
| | B COMPANY | PLATINUM SERIES | B11 | B21 | B31 | B41 |
| | | SILVER SERIES | B12 | B22 | B32 | B42 |
| | C COMPANY | WHITE SERIES | C11 | C21 | C31 | C41 |
| | | PINK SERIES | C12 | C22 | C32 | C42 |
| NORMAL SKIN-USE | A COMPANY | ROSE SERIES | A15 | A25 | A35 | A45 |
| | | LILY SERIES | A16 | A26 | A36 | A46 |
| | B COMPANY | PLATINUM SERIES | B15 | B25 | B35 | B45 |
| | | SILVER SERIES | B16 | B26 | B36 | B46 |
| | C COMPANY | WHITE SERIES | C15 | C25 | C35 | C45 |
| | | PINK SERIES | C16 | C26 | C36 | C46 |
| OILY SKIN-USE | A COMPANY | ROSE SERIES | A18 | A28 | A38 | A48 |
| | | LILY SERIES | A19 | A29 | A39 | A49 |
| | B COMPANY | PLATINUM SERIES | B18 | B28 | B38 | B48 |
| | | SILVER SERIES | B19 | B29 | B39 | B49 |
| | C COMPANY | WHITE SERIES | C18 | C28 | C28 | C48 |
| | | PINK SERIES | C19 | C29 | C29 | C49 |

FIG. 4

| CLEANSING MATERIAL | RACK COORDINATES | LAMP COORDINATES | FACE-WASHING MATERIAL | RACK COORDINATES | LAMP COORDINATES | COSMETIC LOTION | RACK COORDINATES | LAMP COORDINATES |
|---|---|---|---|---|---|---|---|---|
| A11 | 11-a | 30a | A21 | 12-a | 31a | A31 | 13-a | 32a |
| A12 | 11-b | 30b | A22 | 12-b | 31b | A32 | 13-b | 32b |
| B11 | 11-c | 30c | B21 | 12-c | 31c | B31 | 13-c | 32c |
| B12 | 11-d | 30d | B22 | 12-d | 31d | B32 | 13-d | 32d |
| C11 | 11-e | 30e | C21 | 12-e | 31e | C31 | 13-e | 32e |
| C12 | 11-f | 30f | C22 | 12-f | 31f | C32 | 13-f | 32f |
| A15 | 11-a | 30a | A25 | 12-a | 31a | A35 | 13-a | 32a |
| A16 | 11-b | 30b | A26 | 12-b | 31b | A36 | 13-b | 32b |
| B15 | 11-c | 30c | B25 | 12-c | 31c | B35 | 13-c | 32c |
| B16 | 11-d | 30d | B26 | 12-d | 31d | B36 | 13-d | 32d |
| C15 | 11-e | 30e | C25 | 12-e | 31e | C35 | 13-e | 32e |
| C16 | 11-f | 30f | C26 | 12-f | 31f | C36 | 13-f | 32f |
| A18 | 11-a | 30a | A28 | 12-a | 31a | A38 | 13-a | 32a |
| A19 | 11-b | 30b | A29 | 12-b | 31b | A39 | 13-b | 32b |
| B18 | 11-c | 30c | B28 | 12-c | 31c | B38 | 13-c | 32c |
| B19 | 11-d | 30d | B29 | 12-d | 31d | B39 | 13-d | 32d |
| C18 | 11-e | 30e | C28 | 12-e | 31e | C28 | 13-e | 32e |
| C19 | 11-f | 30f | C29 | 12-f | 31f | C29 | 13-f | 32f |

| No. | IVENT | CATEGORY | | PRODUCT | | CONTENTS NUMBER | EFFECT SOUND NUMBER |
|---|---|---|---|---|---|---|---|
| | | CODE | NAME | CODE | NAME | | |
| 1 | SINGLE PICKUP | 001 | CLEANSING MATERIAL | 4902430 | ROSE CLEANSING FOR DRY SKIN-USE | C01 | P1 |
| 2 | SINGLE PICKUP | 001 | CLEANSING MATERIAL | 4902431 | ROSE CLEANSING FOR NORMAL SKIN-USE | C02 | P1 |
| 3 | SINGLE PICKUP | 003 | COSMETIC LOTION | 2902411 | ROSE COSMETIC LOTION FOR DRY SKIN-USE | C03 | P2 |
| 4 | SINGLE PICKUP | 003 | COSMETIC LOTION | 4902412 | ROSE COSMETIC LOTION FOR NORMAL SKIN-USE | C04 | P2 |
| 5 | SINGLE PICKUP | 004 | MILKY LOTION | 4902421 | ROSE MILKY LOTION FOR DRY SKIN-USE | C05 | P3 |
| 6 | SINGLE PICKUP | 011 | SHAMPOO | 4902150 | DAMAGE SHAMPOO | C09 | P6 |
| ... | | | | ... | | | |
| 30 | CONTINUOUS PICKUPS | 001 | CLEANSING MATERIAL | — | — | C11 | P8 |
| 31 | CONTINUOUS PICKUPS | 003 | COSMETIC LOTION | — | — | C12 | P8 |
| 32 | CONTINUOUS PICKUPS | 011 | SHAMPOO | — | — | C19 | P9 |
| ... | | | | | | | |

PRODUCT DISPLAY RACK SYSTEM, PRODUCT DISPLAY RACK METHOD, AND PRODUCT DISPLAY RACK PROGRAM

CROSS REFERENCE TO RELATED APPLICATION

This application is entitled to the benefit of and incorporates by reference subject matter disclosed in the International Patent Application No. PCT/JP2013/072972 filed on Aug. 28, 2013 and Japanese Patent Application 2012-209663 filed Sep. 24, 2012.

TECHNICAL FIELD

The present invention relates to a product display rack system, a product display rack method and a product display rack program for such a system, by which, when a customer takes a product displayed on a display rack in the hand, products related to the product taken by the customer in the hand are guided to the customer.

BACKGROUND ART

In recent years, a product display rack system has been proposed in which an RFID (Radio Frequency Identification) tag having a radio communication function is attached to a product, and by carrying out communications with the RFID tag, a product that has been taken from a desired display rack by a customer in the hand is detected so that information as to the degree of interest of the customer with the product is collected by using a computer. With respect to a document that describes the technique about this product display rack system, the following Japanese Patent Application Laid-Open Publication No. 2007-115152 is proposed. The product display rack system described in Japanese Patent Application Laid-Open Publication No. 2007-115152 is provided with: an intelligent rack including a product display rack on which products of a plurality of types to which RFID tags are attached are mounted; a plurality of antennas for detecting a tag serial number from the RFID tag of the corresponding product; and a pair of human detection sensors placed on the two ends of the product display rack; and a tag-product ID registration table in which the tag serial number and the product ID applied to each of the product kinds are stored in association with each other, and in this technique, by using the combination of the inputted tag serial number and the antenna that has detected the tag serial number, the fact that a specific product is taken from, or returned to a specific product display rack, is detected, and by using a time difference of the detections of the paired human detection sensors, the moving direction of a human body is also detected so that information relating to the degree of interest of the customer with the product is obtained.

SUMMARY

In the technique described in the above-mentioned Japanese Patent Application Laid-Open Publication No. 2007-115152, by collecting information relating to a product taken from a display rack by a customer in the hand, or returned to the display rack by the customer, information concerning the degree of interest of the customer with the product can be obtained. However, this technique has a problem in that no sales promoting action for guiding the customer to other products based upon the collected degree of interest is taken into consideration. Moreover, in the technique described in Japanese Patent Application Laid-Open Publication No. 2007-115152, for example, in the case when a customer is looking for a group of skin care products, such as, for example, a cleansing material for dry skin, a face washing material, a cosmetic lotion, a milky lotion, or the like, upon selecting an individual product, the customer needs to look for a product for dry skin among many types of products, such as another series of the same maker, products of the other makers or the like, depending on the customer's tastes; however, the customer has to first look for which position of a rack products preferred by the customer are placed, which causes a problem of complexity to the customer in finding preferred products.

In order to solve the above-mentioned problem of the prior art, an object of the present invention is to provide a product display rack system that guides other products relating to a product taken by the customer in the hand to the customer so as to promote the sales, as well as a product display rack method and a product display rack program for such a system.

In order to achieve the above-mentioned object, a product display rack system in accordance with a first aspect of the present invention, which displays a plurality of products having a plurality of product types and functional types, each having an RFID tag having a radio communication function for an RFID number attached thereto, and related products in association with a product taken by a customer in the hand are guided to the customer, and the system includes:

a plurality of product display racks on which the plurality of products with the RFID tags attached thereto are displayed; a plurality of RFID readers for detecting the RFID numbers from the RFID tags of the products displayed on the product display racks; a lamp guiding unit for guiding the customer to the position of the product displayed on each of the plurality of product display racks by a lighted lamp or a flickering lamp; a product related information data base in which relations among the product types and functional types of the plurality of products are stored; a product coordinate data base in which product display coordinates for the product display rack for each of the product types are stored; and control means which based upon the results of detection by the RFID reader, guides other products related to the product taken by the customer in the hand, and in this system, the control means carries out: a first step for detecting an RFID number of a product taken by a customer from a desired display rack based upon the detection result of the RFID reader; a second step for acquiring RFID numbers of related products having related product types and functional types relative to the product type of the RFID number from the product related information data base by using the RFID number detected in the first step as a key; a third step for acquiring the product display coordinates of the product type from the product coordinate data base by using the RFID number of the related product acquired in the second step as a key; and a fourth step for lighting or flickering the lamp of the lamp guiding unit at a position close to the product display coordinates acquired in the third step.

Moreover, in accordance with a second aspect of the present invention, the product display rack system according to the first aspect is provided with: an image display unit for displaying an image; and an image data base for storing a commercial image for a product corresponding to a RFID number, and the control means carries out a fifth step for retrieving the commercial image for the product related to the RFID number from the image data base by using the RFID number detected in the first step as a key so as to display the corresponding image on the image display unit.

Moreover, in accordance with a third aspect, the product display rack system according to the first or second aspect of the present invention is characterized in that, when, in the second step, the control means determines that a customer has taken a plurality of products in the hand within a predetermined period of time, the control means carries out a sixth step in which the functional types and series of the plurality of products taken by the customer in the hand are determined, and upon determination that products of the same functional type have been taken in the hand, other products having the same functional type are acquired as the related products, while upon determination that products of the same series have been taken in the hand, other functional-type products in the same series are acquired so that a commercial message sentence relating to each of the related products corresponding to the RFID numbers of the acquired related products is displayed on the image display unit.

Furthermore, in accordance with a fourth aspect, in the product display rack system according to the first or second aspect, the control means carries out a seventh step in which when a predetermined period of time has elapsed from the start of the lighting or flickering of the lamp in the fourth step, a determination is made as to whether or not the product that has been taken by the customer in the hand has been returned to the product display rack by using the RFID reader, and upon determination that the product has been returned, the RFID numbers and product display coordinates are read from the RFID tags of all the products displayed on the plurality of the product display racks so that the product display coordinates for each of the product types are stored in the product coordinate data base.

Furthermore, in accordance with a fifth aspect, in the product display rack system according to the third aspect in the present invention, the control means carries out a seventh step in which when a predetermined period of time has elapsed from the start of the lighting or flickering of the lamp in the fourth step, a determination is made as to whether or not the product taken by the customer in the hand has been returned to the product display rack by using the RFID reader, and upon determination that the product has been returned, the RFID numbers and product display coordinates are read from the RFID tags of all the products displayed on the plurality of the product display racks so that the product display coordinates for each of the product types are stored in the product coordinate data base.

Furthermore, in accordance with a sixth aspect of the present invention, in the product display rack system according to the third aspect, the control means carries out a step in which upon determination that the product taken by the customer in the hand in the sixth step has not been returned to the product display rack, the lighting or flickering of the lamp in the lamp guiding unit in the fourth step and the image display by the image display unit are stopped.

Moreover, in accordance with a seventh aspect, a product display rack method for a computer system which can guide other products related to the product taken by the customer in the hand, and the system includes: a plurality of product display racks on which a plurality of products having a plurality of product types and functional types, each having an RFID tag having a radio communication function for an RFID number attached thereto, are displayed; a plurality of RFID readers for detecting the RFID numbers from the RFID tags of the products displayed on the product display racks; a lamp guiding unit for guiding the customer to the position of the product displayed on each of the plurality of product display racks by a lighted lamp or a flickering lamp; a product related information data base in which relations among the product types and functional types of the plurality of products are stored; a product coordinate data base in which product display coordinates for the product display rack for each of the product types are stored; and control means which based upon the results of detection by the RFID reader, the control means carries out: a first step for detecting an RFID number of a product taken by a customer from a desired display rack based upon the detection result of the RFID reader; a second step for acquiring RFID numbers of related products having related product types and functional types relative to the product type of the RFID number from the product related information data base by using the RFID number detected in the first step as a key; a third step for acquiring the product display coordinates of the product type from the product coordinate data base by using the RFID number of the related product acquired in the second step as a key; and a fourth step for lighting or flickering the lamp of the lamp guiding unit at a position close to the product display coordinates acquired in the third step.

In accordance with a eighth aspect, in the product display rack method according to the seventh aspect, the computer system further includes: an image display unit for displaying an image; and an image data base for storing a commercial image of a product corresponding to the RFID number, and the control means carries out a fifth step in which by using the RFID number detected in the first step as a key, a commercial image for a product corresponding to the RFID number is retrieved from the image data base, and displayed on the image display unit.

In accordance with a ninth aspect of the present invention, in the product display rack method according to the seventh or eighth aspect, the control means carries out a sixth step in which upon determination that a customer has taken a plurality of products in the hand within a predetermined period of time in the second step, the functional types and the series of the plurality of the products taken by the customer in the hand are determined, and upon determination that the customer has taken products of the same functional type, other products of the same functional type are acquired as related products, while upon determination that products of the same series have been taken in the hand, products of another functional type of the same series are acquired so that commercial message sentences in association with the related products corresponding to the acquired related product RFID numbers are displayed on the image display unit.

Moreover, in accordance with a tenth aspect of the present invention, in the product display method according to the seventh or eighth aspect, the control means carries out a seventh step in which when a predetermined period of time has elapsed since the lighting or flickering of a lamp in the fourth step, it is determined whether or not the product taken by the customer in the hand has been returned to the product display rack by using the RFID reader, and upon determination that the product has been returned, the RFID numbers and the product display coordinates are read from the RFID tags of all the products displayed on the plurality of the product display racks so that the product display coordinates for each of the product types are stored in the product coordinate data base.

Moreover, in accordance with an eleventh aspect of the present invention, in the product display rack method according to the ninth aspect, the control means carries out a seventh step in which when a predetermined period of time has elapsed since the lighting or flickering of a lamp in the fourth step, it is determined whether or not the product taken by the customer in the hand has been returned to the product display rack by using the RFID reader, and upon determination that it has been returned, the RFID numbers and the product display coordinates are read from the RFID tags of all the products displayed on the plurality of the product display racks so that the product display coordinates for each of the product types are stored in the product coordinate data base.

Moreover, in accordance with a twelfth aspect of the present invention, in the product display rack method according to the ninth aspect, the control means carries out a step in which upon determination that the product taken by the customer in the hand in the sixth step has not been returned to the product display rack, the lighting or flickering of the lamp in the lamp guiding unit in the fourth step and the image display by the image display unit are stopped.

Furthermore, in accordance with a thirteenth aspect of the present invention, a product display rack program for a computer system, in which the related products in association with the product taken by the customer in the hand are guided to the customer, the computer system includes a plurality of product display racks on which a plurality of products having a plurality of product types and functional types, with RFID tags capable of exerting a radio communication function for RFID numbers being attached thereto, are displayed; a plurality of RFID readers for detecting the RFID numbers from the RFID tags of the products displayed on the product display racks; a lamp guiding unit for guiding the customer to the product position displayed on each of the plurality of product display racks by a lighted lamp or a flickering lamp; a product related information data base in which relationships among the product types and functional types of the plurality of the products are stored; a product coordinate data base in which product display coordinates for the product display rack for each of the product types are stored; and control means which based upon the results of detection by the RFID reader, guides other products related to a product taken by the customer in the hand, and the program allows the control means to realize a first function for detecting an RFID number of a product taken by a customer from a desired display rack based upon the detection result of the RFID reader; a second function for acquiring RFID numbers of related products having corresponding product types and functional types relative to the product type of the RFID number from the product related information data base by using the RFID number detected in the first function as a key; a third function for acquiring the product display coordinates of the product type from the product coordinate data base by using the RFID number of the related product acquired in the second function as a key; and a fourth function for lighting or flickering the lamp of the lamp guiding unit at a position close to the product display coordinates acquired in the third function.

Moreover, in accordance with a fourteenth aspect of the present invention, in the product display rack program according to the twelfth aspect, the computer system further includes: an image display unit for displaying an image; and an image data base for storing commercial images of products in association with the RFID numbers, and this program allows the control means to realize a fifth function for retrieving a commercial image for a product corresponding to the RFID number from the image data base by using the RFID number detected by the first function as a key so that the resulting image is displayed on the image display unit.

Furthermore, in accordance with a fifteenth aspect of the present invention, the product display rack program according to the thirteenth or fourteenth aspect allows the control means to realize a sixth function in which upon determination that in the second function, a customer has taken a plurality of products in the hand within a predetermined period of time, the functional types and series of the plurality of the products taken by the customer in the hand are determined, and upon determination that products of the same functional type have been taken in the hand, other products of the same functional type are acquired as the related products, while upon determination that products of the same series have been taken in the hand, products of another functional type of the same series are acquired so that commercial message sentences in association with the related products corresponding to the acquired related product RFID numbers are displayed on the image display unit.

Furthermore, in accordance with a sixteenth aspect of the present invention, the product display rack program according to the thirteenth or fourteenth aspect allows the control means to realize a seventh function in which when a predetermined period of time has elapsed since the start of lighting or flickering of the lamp by the fourth function, it is determined whether or not the product taken by the customer in the hand has been returned to the product display rack by using the RFID reader, and upon determination that it has been returned, the RFID numbers and the product display coordinates are read from the RFID tags of all the products displayed on the plurality of the product display racks so that the product display coordinates for each of the product types are stored in the product coordinate data base.

Furthermore, in accordance with a seventeenth aspect of the present invention, the product display rack program according to the fifteenth aspect of the invention allows the control means to realize a seventh function in which when a predetermined period of time has elapsed since the start of lighting or flickering of the lamp by the fourth function, it is determined whether or not the product taken by the customer in the hand has been returned to the product display rack by using the RFID reader, and upon determination that it has been returned, the RFID numbers and the product display coordinates are read from the RFID tags of all the products displayed on the plurality of the product display racks so that the product display coordinates for each of the product types are stored in the product coordinate data base.

Furthermore, in accordance with an eighteenth aspect of the present invention, the product display rack program according to the fifteenth aspect allows the control means to carry out a process in which upon determination that the product taken by the customer in the hand in the sixth function has not been returned to the product display rack, the lighting or flickering of the lamp in the lamp guiding unit and the image display by the image display unit in the fourth function are stopped.

In the product display rack system, product display rack method and product display rack program in accordance with the present invention, by carrying out a first step for detecting an RFID number of a product taken by a customer in the hand from a desired display rack by the RFID reader, a second step in which by using the RFID number thus read as a key, RFID numbers of related products whose product types and functional types are in association with the product type of the read RFID number are acquired from the product related information data base, a third step in which by using the RFID number thus acquired as a key, product display coordinates of the product type are acquired from the product coordinate data base, and a fourth step in which a lighting or flickering process of the lamp of a lamp guiding unit close to the product display coordinates is carried out; thus, it is possible to guide other products relating to the product taken by a customer in the hand to the customer by the lamp guiding unit so as to promote sales operations.

BRIEF DESCRIPTIONS OF THE DRAWINGS

FIG. 2 is a view for explaining a product data base in accordance with the present embodiment;

FIG. 3 is a view for explaining a product related information data base in accordance with the present embodiment;

FIG. 4 is a view for use in explaining a product coordinate data base in accordance with the present embodiment;

FIG. 8 is a view for explaining a product related information data base in accordance with the modified example of the present invention;

DETAILED DESCRIPTION

Referring to FIGS., the following description will discuss one embodiment of a product display rack system that realizes a product display rack method and a product display rack program in accordance with the present invention in detail.

Premise

First, the following description will discuss respective terms used for products with RFID tags attached thereto and the present specification, which form the premise of the present embodiment.

(1) Products that form targets of the present embodiment include those products, each having a plurality of product types (category types) having respectively different product purposes, such as, for example, women's skin-care products including cleansing materials, face-washing materials, cosmetic lotions, milky lotions, or the like, and each also having functional types in accordance with customer's skin, such as dry skin, normal skin, oily skin or the like, for each of individual products. However, the present invention is not intended to be limited by the above-mentioned product types and functional types, and includes series (group) products, such as, for example, the above-mentioned skin-care products including cleansing materials, face-washing materials, cosmetic lotions, milky lotions, or the like, with a brand name attached thereto as the same product group of the same maker.

The products forming the target of the present embodiment include a first category type corresponding to product types, and a second category type that is in common with different product types, such as use object (characteristic) of a product, makers, brand names, series names or the like, as at least attributes.

Figure 5:
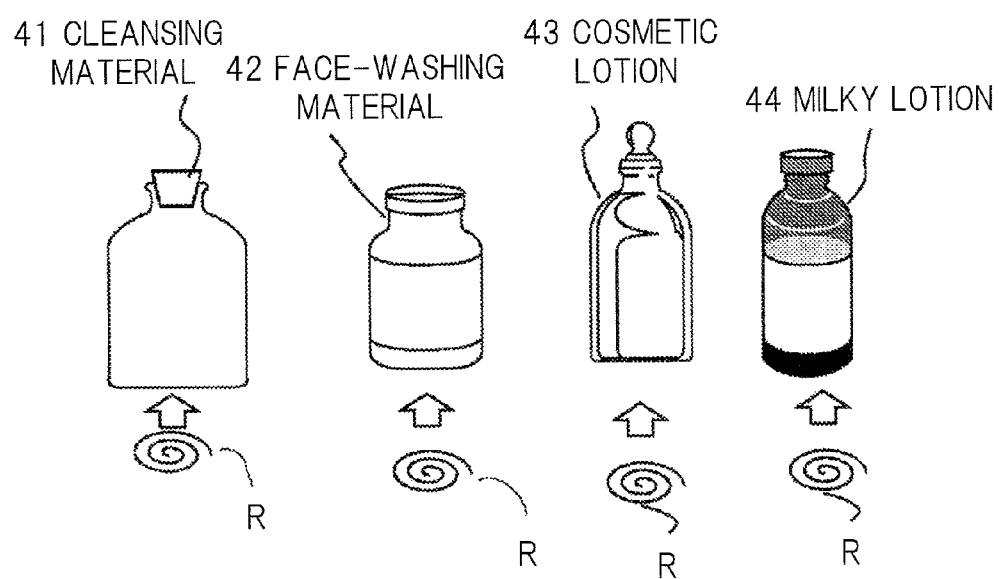
FIG. 5 is a view for explaining products and RFID tags used in the present embodiment.

(2) As shown in FIG. 5, the product to be explained in the present embodiment relates to skin-care products for women, and includes four product groups, such as a cleansing material 41 for the purpose of rinsing off oily components of cosmetics or the like on the skin, a face-washing material 42 for the purpose of rinsing off stains on the skin, a cosmetic lotion 43 for the purpose of maintaining moisture on the skin, and a milky lotion 44 for the purpose of preventing moisture component from evaporating by applying moisture and oily components to the skin. These individual products have only the tag serial number (UID: Unique Item Identification, that is, an exclusively reading-use ID for uniquely identifying the tag) attached thereto so as to be distinguished from the other products, with an RFID tag R capable of exerting radio communication function being pasted onto the bottom surface or the like of the product, and the RFID tag to be pasted thereon is predetermined for each of RFID numbers to be described later.

(3) Product type numbers to be explained in the present embodiment are set by a maker for each of the product types, each of the functional types and each of the series (groups), and these more specifically correspond to maker's model numbers.

(4) The RFID number to be explained in the present embodiment is designed such that by preparing a conversion table (not shown) formed based upon combinations of the tag serial number and the product type number that are uniquely assigned to each of the RFID tags, a conversion process to a product type number is carried out based upon a tag serial number that is detected, or not detected by the RFID reader. In the present specification, the above-mentioned conversion process will be omitted. Additionally, the present embodiment is not intended to be limited by the configuration requiring the above-mentioned conversion process, and may have a configuration in which, for example, by storing a product type number in the RFID tag by utilizing a data writing function of the RFID tag, for each of the RFID tags, the product type number stored in the RFID tag may be read.

Configuration

Figure 1:
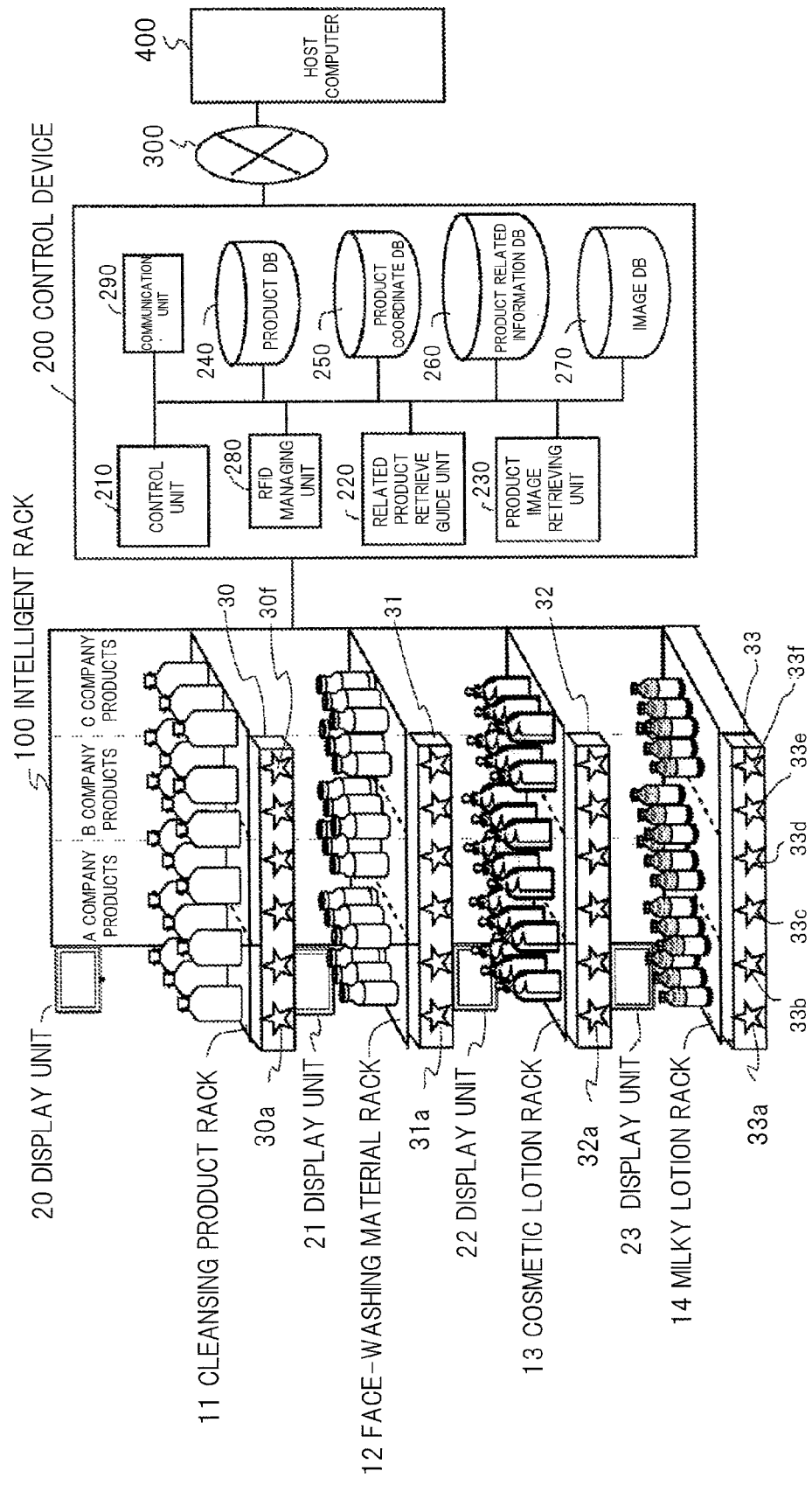
FIG. 1 is a view showing a configuration of a product display rack system in accordance with an embodiment of the present invention.

As shown in FIG. 1, the product display rack system in accordance with the present embodiment is provide with: an intelligent rack 100 having a plurality of product racks disposed in multiple stages, each having products of an A company, a B company and a C company (hereinafter, referred to as a plurality of companies) mounted thereon and having a function for reading the RFID number of the RFID tag of each of products mounted thereon by using an RFID reader (not shown), and a control device 200 that guides another product related to the product taken by a customer in the hand to the customer, based upon the RFID number read by the RFID reader of the intelligent rack 100, and the control device 200 is connected to a host computer 400 that executes product sales managements or the like, through a network 300.

The above-mentioned intelligent rack 100 is provided with: a cleansing product rack 11 on which cleansing materials (products) of a plurality of companies are mounted, with an RFID reader including an antenna for reading the RFID number from each of the RFID tags of the cleansing materials (products) being mounted thereon, a face-washing material rack 12 on which face-washing materials (products) of a plurality of companies are mounted, with an RFID reader including an antenna for reading the RFID number from each of the RFID tags of the face-washing materials (products) thus mounted being installed thereon, a cosmetic lotion rack 13 on which cosmetic lotions (products) of a plurality of companies are mounted, with an RFID reader including an antenna for reading the RFID number from each of the RFID tags of the cosmetic lotions (products) thus mounted being installed thereon, and a face-washing material rack 14 on which milky lotions (products) of a plurality of companies are mounted, with an RFID reading including an antenna for reading the RFID number from each of the RFID tags of the milky lotions (products) thus mounted being installed thereon, and further includes image display units 20 to 23 that are attached to the side faces of the respective racks 11 to 14 so as to display commercial images or the like of the products, and lamp guiding units 30 to 34 that are attached to the respective racks 11 to 14, and flicker lamps so as to guide the customer to the mounted products.

To the above-mentioned image display units 20 to 23 and/or lamp guiding units 30 to 34, functions for advertising and guiding another product by using voice may be added. Moreover, the number of the image displays 20 to 23 and the lamp guiding units 30 to 34 are not intended to be limited in the present invention.

Each of the RFID readers mounted on the respective product racks 11 to 14 is designed to place a large number of antennas at product mounting positions, and have such a function that depending on the position of the antenna that has received the RFD number from an RFID tag, the RFID number and the product mounting position coordinates of the product with the corresponding RFID tag mounted thereon are detected.

Each of the lamp guiding units 30 to 34 is provided with lamps (30a, 30f, 33a to 33f and other lamps whose reference numerals are omitted) indicated by star marks, which are attached to a laterally elongated product mounting position of each of the product racks 11 to 14, and has a function for selectively lighting or flickering the lamps.

The control device 200 is provided with a product data base 240 that stores an RFID number for each of different series, different product types and different functions so as to be classified for each of makers of products mounted on the intelligent rack 100, a product related information data base 260 in which the RFID numbers stored in the product data base 240 in classified states in different functions, different makers and different series are developed into different functions or the like, and stored, an image data base 270 in which commercial images of products for each product type (for each RFID number) are stored, an RFID managing unit 280 that detects the RFID numbers and detection coordinates of display products read out by the RFID readers, and stores them in the product coordinate data base 250, a related product retrieve guide unit 220 which based upon the RFID number of a product taken by a customer in the hand, retrieves another product of the product taken by the customer in the hand, and guides the resulting product to the customer, a product image retrieving unit 230 that retrieves commercial images for the respective products stored in the image data base 270, and displays the resulting image on any one of the image display units 20 to 23, and a communication unit 290 for use in communicating with the host computer 400.

In the product data base 240, as shown in FIGS. 2(*a*) to 2(*c*), the RFID numbers of products classified in different series and different functions for each of the makers are stored, that is, for example, as the products of the A company, "rose series" and "lily series" are included, and the RFID numbers of products having different functions, such as "dry skin-use", "normal skin-use" and "oily skin-use", are stored for each of the series. The products of the A company classified by different functions are stored such that in the case of the "skin care" function, the product types, such as "cleansing materials", "face-washing materials", "cosmetic lotions" and "milky lotions" are present as products, and RFID numbers from "A11" to "A49" are stored as shown in the FIGS., for individually different product types.

The products of the B company include "platinum series" and "silver series", and products having different functions, such as "dry skin-use", "normal skin-use" and "oily skin-use", are present for each series, and in the case of the "skin care" function, the product types, such as "cleansing materials", "face-washing materials", "cosmetic lotions" and "milky lotions" are present as products, and RFID numbers from "B11" to "B49" are stored as shown in the FIGS., for individually different product types.

The products of the C company include "white series" and "pink series", and products having different functions, such as "dry skin-use", "normal skin-use" and "oily skin-use", are present for each series, and in the case of the "skin care" function, the product types, such as "cleansing materials", "face-washing materials", "cosmetic lotions" and "milky lotions" are present as products, and RFID numbers from "C11" to "C49" are stored as shown in the FIGS., for individually different product types.

The product related information data base 260 is designed such that, as shown in FIG. 3, the RFID numbers, stored in the product data base 240 for each of the makers, are arranged for different makers and different series for each of the functions, and stored therein. In the product related information data base 260, for example, when attention is focused on the product having the RFID number "A12" for use in dry skin of the product type "cleansing materials", as the same product type for use in dry skin, other products with RFID numbers "A11", "B11", "B12", "C11" and "C12" on the longitudinal rows are proposed, and as the product type of the same series and the same maker, the face-washing material of the RFID number "A22", the cosmetic lotion of the RFID number "A32" and the milky lotion of the RFID number "A42" on the lateral row are proposed as the related products. In the present specification, the products on the table longitudinal rows represent related products of the same product type and the same functional type, and the products on the table lateral row are referred to as the related products belonging to the same series.

The related product retrieve guide unit 220 has such a function that upon selection of a desired RFID number, the product related information data base 260 is retrieved by using the selected RFID number as a key, so as to select the RFID numbers of other products of the same product type in the table longitudinal direction as recommended products having the same function, with the above-mentioned specific RFID number within the same function (dry skin, normal skin or oily skin) to which the retrieved RFID number belongs being used as a starting point, so that the RFID numbers of other products in the same series in the lateral direction are selected as recommended products of the same series.

This function is more specifically explained as follows: the related product retrieve guide unit 220 refers to the product related information data base 260 shown in FIG. 3, and in the case when, for example, the RFID number "A12" of the lily series of the A company is selected as the cleansing material for use in dry skin, by selecting (1) the products having the RFID numbers of "A11", "B11", "B12", "C11" and "C12" on the longitudinal rows as other product types for use in dry skin of the same functional type as that of the RFID number "A12", the other products of the same function (dry skin-use) as that of the specific cleansing material for dry skin are selected and recommended to the customer, and by selecting (2) the products having the RFID numbers "A22", "A32" and "A42" on the lateral row as other product types for use in dry skin of the same series as that of the product having the RFID number "A12", these products are selected and recommended to the customer.

As shown in FIG. 4, the above-mentioned product coordinate data base 250 stores rack coordinates at which each of products is mounted for each RFID number and lamp coordinates of the lamp guiding unit corresponding to the mounting position of each product, and the numbers "30 to 32" in the drawing indicate the numbers of the racks, with coordinates of the positions from the left end to the right end of each laterally elongated rack being indicated by alphabets "a to f" in the drawing.

The table of the product coordinate data base 250 is, for example, arranged so that (1) mounting coordinates "11-*a*" correspond to the coordinates on the left end of a rack 11, with lamp coordinates "30*a*" being set to indicate the coordinates on the left end of the lamp guiding unit 30, (2) mounting rack coordinates "11-*a*" correspond to a product having an RFID number "A11" of a product type "cleansing material", with lamp coordinates "30*a*" corresponding to the mounting rack coordinates "11-*a*", (3) mounting rack coordinates "12-*a*" correspond to a product having an RFID number "A21" of a product type "face-washing material", with lamp coordinates "31*a*" corresponding to the mounting rack coordinates "12-*a*", and (4) mounting rack coordinates "13-*a*" correspond to a product having an RFID number "A31" of a product type "cosmetic lotion", with lamp coordinates "32*a*" corresponding to the coordinates "13-*a* ".

The aforementioned RFID managing unit 280 has functions for detecting the RFID number and the detected coordinates of a displayed product read by the RFID reader and mounted on each of a plurality of racks 11 to 14 so as to store the data in the product coordinate data base 250, and for retrieving commercial images of products for each of the product types stored in the image data base 270 by using the RFID number instructed by the control unit 210 as a key so as to display the resulting data on any one of the image display units 20 to 23.

Operation

Figure 6:
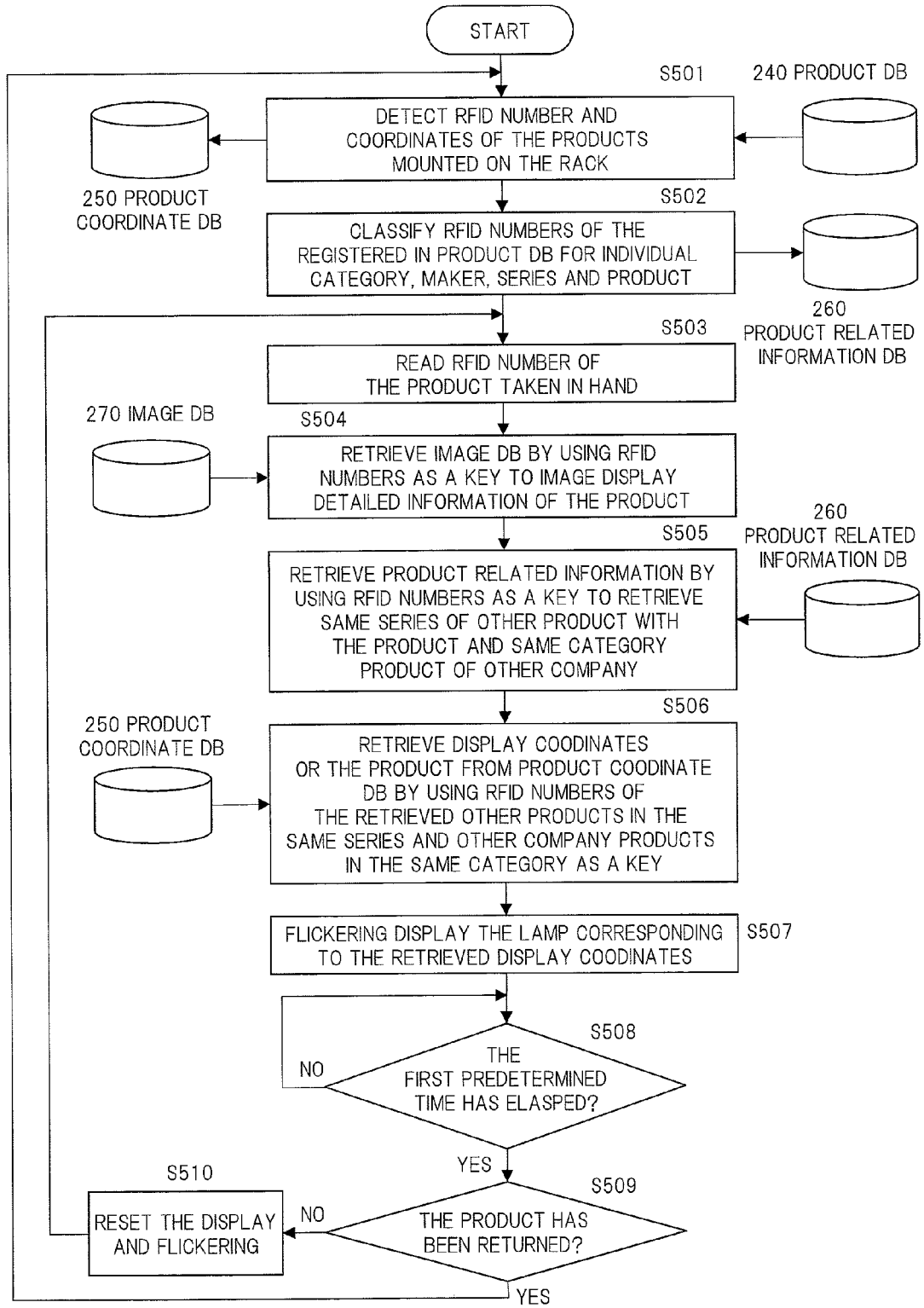
FIG. 6 is a view showing a guiding process flow for products displayed on racks in accordance with the present embodiment.

As shown in FIG. 6, the product display rack system configured as described above is provided with: a step S501 in which in a state where a plurality of cleansing materials, face-washing materials, cosmetic lotions and milky lotions are displayed on the respective product rack 11 to 14 of the aforementioned intelligent rack 100, the RFID managing unit 280 reads the RFID number of the RFID tag pasted onto each product and the product coordinates by using the RFID tag reader by the control of the control unit 210 of the control device 200, and while referring to the product data base 240, stores the resulting data in the product coordinate data base 250; a step S502 in which the RFID numbers, which are classified based upon the individual makers, and stored in the product data base 240, are classified based upon individually different functions, different makers and different series, so that the resulting data are stored in the product related information data base 260; a step S503 in which in a state where these products are displayed, when a customer comes into the store and takes a product in hand, and when he leaves it from the RFID reader by a predetermined distance or more, the RFID managing unit 280 detects that the RFID tag of the product in the customer's hand is separated from the RFID reader by a predetermined distance or more, with the result that no longer communicated therewith, and also detects the RFID number with which communication is no longer available and the antenna coordinates thereof; and a step 504 in which by using the RFID number detected in the step S503 as a key, the image data base 270 is retrieved so as to display a commercial image of the product relating to the product in the customer's hand on the image display unit of the product mounting rack of the product in the customer's hand; thus, by carrying out the above-mentioned steps, the detailed explanation of the product taken by the customer in the hand can be guided to the customer by using the commercial image and voice on the image display unit.

Next, the product display rack system executes a step S505 in which by using the RFID number of the product taken by the customer in the hand as a key, the related product retrieve guiding unit 220 retrieves RFID numbers of related products stored in the product related information data base 260. The related products to be retrieved in this step S505 are explained as follows: for example, as described earlier, in the case when a cleansing material for dry skin having an RFID number "A12" of a lily series of A company is taken in the customer's hand, related products having RFID numbers "A11", "B11", "B12", "C11" and "C12" of the same function (category) for use in dry skin as that of the RFID number "A12" are retrieved, and with respect to other product types for use in dry skin in the same series as the RFID number "A12", related products with RFID numbers "A22", "A32" and "A42" are also retrieved.

In this step S505, the above-mentioned operations are carried out when a customer takes one product in the hand; however, in the case when a customer takes one product in the hand, and within a predetermined period to time, the customer takes another product in the hand, the functional (category) types and series types of the both two products are determined, and in the case when the functional types of the product first taken in the hand and the next product are the same (for example, in the case when, in succession to a cleansing material of an A company, another cleansing material of a B company is taken in the hand), it is determined that the customer is looking for products having the same function, an RFID number of a cleansing material for dry skin of a C company having the same function (category) is retrieved as a related product, while in the case when the product first taken in the hand and the next product have different functional types and the same maker (for example, in the case when, in succession to a cleansing material of an A company, a milky lotion of the A company is taken in the hand), it is determined that the customer is looking for products of the same maker, and for example, when the customer has taken a cleansing material of the A company and a face-washing material of the A company in the hand, operations are carried out so as to retrieve RFID numbers of cosmetic lotions and milky lotions for dry skin of the same series of the A company.

That is, the product display rack system in accordance with the present embodiment carries out operations such that in the case when a customer takes only the single product in the hand (single pickup), products having the same function and the same product type as the product taken in the hand are retrieved (for example, when the customer takes a cleansing product for use in function "dry skin" in the hand, another cleansing product for use in dry skin is retrieved), and in the same manner, products of the same series but another product type as that of the product taken by the customer in the hand (for example, when the customer takes a cleansing material for use in function "dry skin" in the hand, a face-washing material, a cosmetic lotion and milky lotion for use in dry skin) are retrieved.

Moreover, the product display rack system carries out operations such that in the case when a customer takes a plurality of products in the hand (continuous pickups), the functional (category) types and series types of the plurality of products taken in the hand are determined, and the customer tendency is determined as to whether the customer is looking for products of the same functional (category) type or products of the same series type, and other products suitable for the customer tendency are retrieved.

Furthermore, the product display rack system in accordance with the present embodiment carries out a step S506 in which by using the RFID numbers of related products retrieved in the step S505 as keys, the product coordinate data base 250 is retrieved so that display coordinates of racks on which products of the corresponding RFID numbers are displayed are retrieved, and a step S507 in which lamp coordinates corresponding to the display coordinates retrieved in step S506 are retrieved from the product coordinate data base so as to flicking display the lamp of the retrieved lamp coordinates; thus, by carrying out the above-mentioned steps, it is possible to guide the customer to the display positions of the products having the same functions and products in the same series as that of the product taken by the customer in the hand.

More specifically, in the present product display rack system, when a customer takes the cleansing product having the RFID number "A12" in the hand, by flicking displaying the lamp at the position corresponding to a cleansing product for dry skin of another company or a product of another type of the same series, the rack-mounting position of a product related to the product taken by the customer in the hand can be guided to the customer. In addition to the lamp flickering display in the lamp guiding unit in the above-mentioned step S507, another arrangement in which, for example, messages, such as, for example, "as products of another company of the cleansing material taken by you in the hand, the following products . . . " or "as face-washing materials of the same brand as the cleansing material for dry skin taken by you in the hand, the following products . . . " is displayed may be used, and this message may be stored in the aforementioned image data base 270, or this message may be designed to be inserted into an image as message characters by using the product image retrieve unit 230 or the like.

Moreover, in the product display rack system of the present embodiment may be provided with a step S508 in which by determining whether or not a first predetermined period of time (for example, two minutes) has elapsed from the flicking display of the lamp in the lamp guiding unit by the step S507 by using a system clock (computer clock), and in the case of the determination that the first predetermined time has not elapsed, the sequence returns to the step S507, a step S509 in which when the fact that the first predetermined time has elapsed is determined in the step S508, it is determined by the detection of the RFID tag as to whether or not the product taken by the customer in the hand has been returned to the rack when the determination is made in the step S508 that the predetermined first predetermined time has elapsed, and upon the determination that the product has been returned to the rack, the sequence returns to the step S501 so as to again carry out processes for detecting the RFID number and the coordinates of the rack-displayed product; and a step S510 in which when the determination is made that the product has not been returned to the rack in the step S509 (in a state where it is held by the customer in the hand, or it is brought to a register), the display of the commercial image of the product by the image display unit by the step S504 and the lamp flicking display of the lamp guiding unit are reset so that the sequence returns to the step S503 in which the determination as to whether or not the next product is taken in the hand is continuously carried out; thus, by carrying out the above-mentioned steps, in the case when, even after the predetermined period of time has elapsed, the product taken by the customer in the hand has not been returned to the rack, the display of the commercial image of the product and the lamp flicking display of the lamp guiding unit are stopped, and the sequence returns to the process in which the next product is taken in the hand, and in the case when it is determined that the product has been returned to the rack, the sequence returns to step S501 since the product might be returned to a different position, and operations are carried out so as to re-register the RFID number and coordinates of the displayed product.

As described above, the product display rack system, the product display rack method and the product display rack program in the present embodiment are allowed to carry out a first step in which the RFID number of a product taken by a customer in the hand from a desired display rack based upon the detection result by the RFID reader is detected, a second step in which by using the RFID number detected in the first step as a key, RFID numbers of related products whose product types and functional types are in association with the product type of the above-mentioned RFID number are acquired from the product related information data base 260, a third step in which by using the RFID number obtained in the second step as a key, product display coordinates of the product type are acquired from the product coordinate data base 250, and a fourth step in which a lighting or flickering process of any one of lamps of the lamp guiding units 30 to 34 having a position close to the product display coordinates acquired in the third step is carried out; thus, by executing the above-mentioned steps, it is possible to guide other products relating to the product taken by a customer in the hand to the customer so as to promote sales operations.

Additionally, not limited by the above-mentioned embodiments, the present invention may be executed in various modified modes. For example, in the above-mentioned embodiments, explanations have been given by exemplifying a configuration in which the control device 200 forms the product coordinate data base 250 based upon information read from the RFID tag of each of products displayed on product racks by the RFID reader; however, the product coordinate data base 250 may be preliminarily prepared by, for example, a host computer 400, and may be registered in the data base. In this case, the product coordinate data base 250 holds information as to which product is displayed on which area of which rack.

Figure 7:
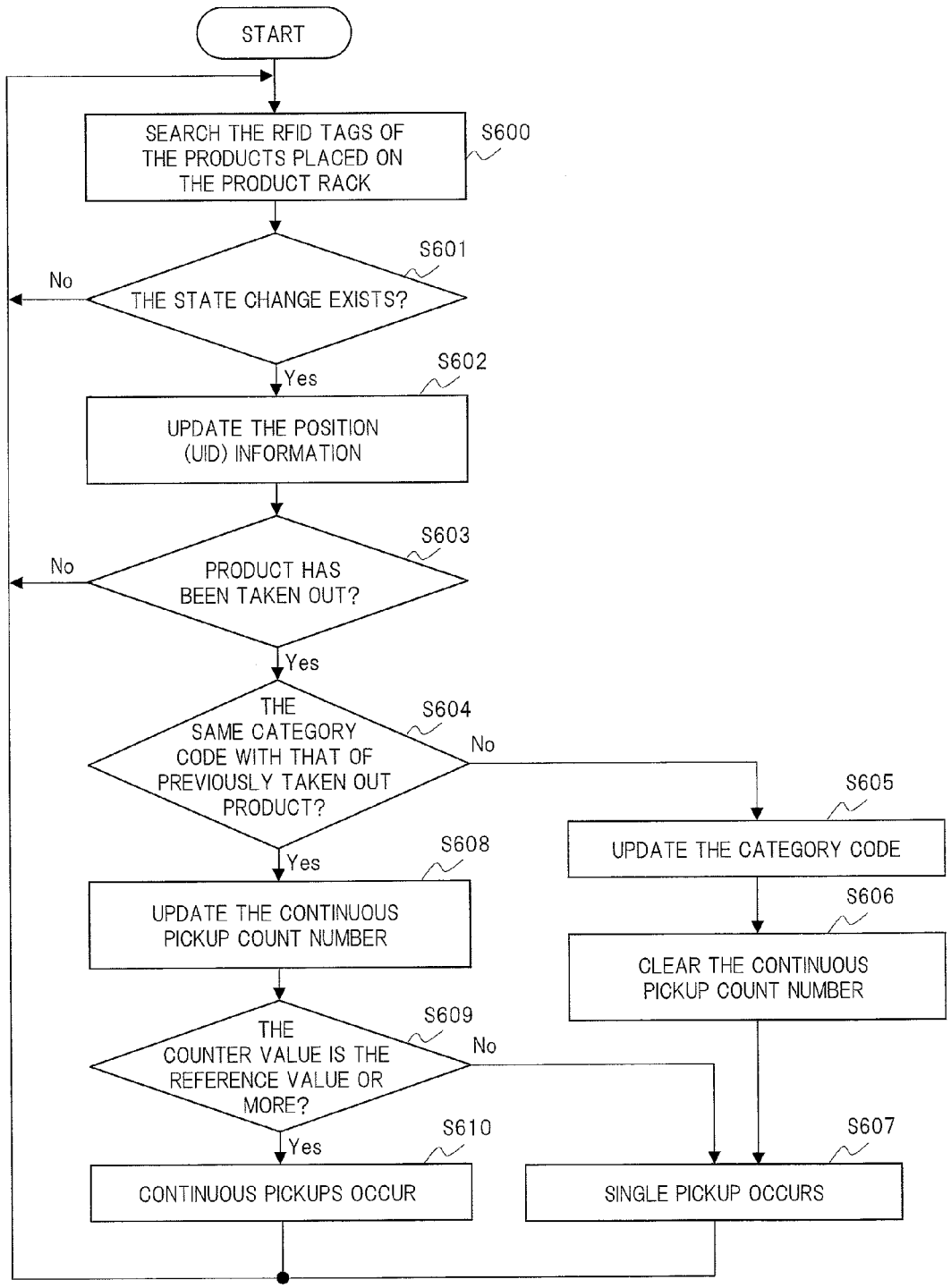
FIG. 7 is a view showing a guiding process flow for products displayed on racks in accordance with a modified example of the present invention.

Moreover, the sequence of processes in the case when a customer takes a plurality of products in the hand within a predetermined period of time is not intended to be limited by that of the above-mentioned embodiments, and for example, a sequence as shown in FIG. 7 may be used to realize the sequence. In this sequence of processes, a step S600 in which the control device 200 allows the RFID reader to search the RFID tags of the products placed on the product racks 11 to 14 with the registered state of the product coordinate data base 250; and a step S601 in which by comparing the search result by the searching process by the step 600 with the search result of the previous searching process, a determination is made as to whether or not any state change exists, and in the case of no state change in the determination, it is returned to the step S600, is executed.

The determination as to the state change in the step S601 is carried out so that based upon tag serial number [UID] information as the results of the previous searching process by the control device 200 (based upon tag serial numbers [UID] obtained by reading the RFID tags of all the products displayed on the product racks 11 to 14 by using all the RFID readers), the state change is determined by making a determination as to whether or not the tag serial number [UID] that was read previously is no longer read, or as to whether or not the tag serial number [UID] that was not read previously is newly read. Additionally, the tag serial number [UID] information desirably includes corresponding relations among the read UID, as well as the RFID reader and the antenna that read the corresponding UID; however, this arrangement is not necessarily required.

Next, the sequence of processes shown in FIG. 7 execute a step S602 in which when the control device 200 which has category codes of products previously taken out held in its memory determines that a state change is present in the aforementioned step S601, it updates the tag serial number [UID] information, a step S603 in which by making a determination as to whether or not a product is taken out based upon whether or not the previously read UID is detected, and when the determination that no product is taken out (a tag serial number [UID] that was not read previously is detected, and the corresponding product has been returned to the product rack) is made, the sequence returns to the aforementioned step S600, and a step S604 in which when the determination is made in the step 603 that a product is taken out, it is determined whether or not the product thus taken out has the same category code to be described later as that of the product that was previously taken out, based upon category codes of the product related information data base 261 shown in FIG. 8.

As shown in FIG. 8, the above-mentioned product related information data base 261 holds corresponding relations among event types indicating whether a single pickup or continuous pickups are carried out, product categories (codes and names of first and/or second category types), products (codes and names), contents numbers, and effect sound numbers. In the example of FIG. 8, as the product categories, category codes and names of product types are held. The contents are image or video image contents for use in introducing products held in the image data base 270, and the contents numbers are numbers for use in specifying the contents. Moreover, the effect sound is sound generated from a speaker (not shown) installed in the intelligent rack 100 upon lighting/flickering the LED, and the effect sound number is a number for use in specifying an effect sound. Additionally, the product category is not intended to be limited by product types (first category), and may be the second category, or may be combinations of these.

Here, the product codes of the product related information data base 261 are assigned to each of the products. The control device 200 has a corresponding information table that indicates corresponding relations among tag serial numbers [UID] read from the RFID tags of the respective products, and category codes and product codes on the product related information data base 261 upon displaying (registering) products on the product racks 11 to 14, and in the process of the above-mentioned step S604, the category code of the detected UID indicating the fact of being taken out from the rack and the product code are read out from the corresponding information table and processes thereafter are carried out.

Next, in the sequence of processes shown in FIG. 7, the control device 200 carries out a step S604 in which when the determination is made in the step S603 that a product has been taken out, it is determined whether or not its category code is the same as that of the previous product, a step S605 in which in the case when the determination is made in step S604 that the category code is not the same, the category code of the previous product is updated and stored, a step S606 in which the counted number of a counter (not shown) for counting the number of continuous pickups corresponding to the number of times in which products of the same category code have been continuously taken by customers in the hand is cleared (reset to 0), and a step S607 in which based upon the determination in the above-mentioned step S604, the sequence proceeds to the event (FIG. 9) of the single pickup, and returns to the aforementioned step S600.

Figure 9:
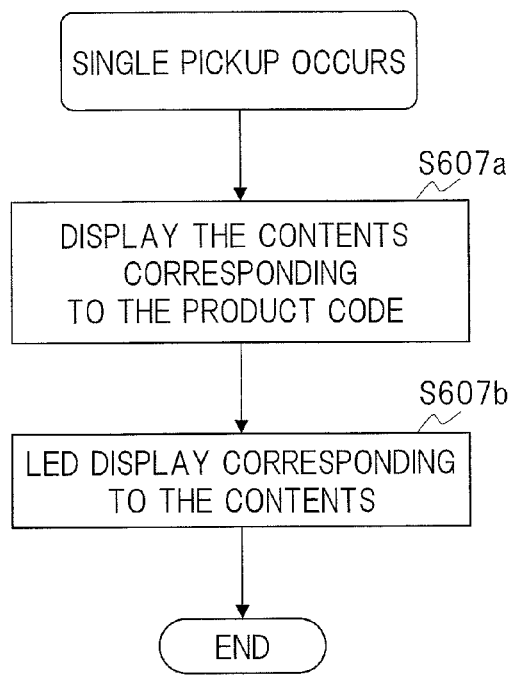
FIG. 9 is a view showing an event process of a single pickup in the guiding process for products displayed on racks in accordance with the modified example of the present invention.

As shown in FIG. 9, the event of the single pickup by this step S607 is that the control device 200 preliminarily holds LED lighting/flickering patterns in association with the respective contents or the respective products (codes), and carries out a step S607*a* in which by using a contents number corresponding to the product code of a product retrieved from the product related information data base 261 as a key, the contents are retrieved from the image data base 270 and displayed on the display unit 20, and a step S607*b* in which the LED of the product rack on which the detected product is mounted is controlled. In the above-mentioned step S607*a*, for example, in the case when a product with a product code "4902430" is detected, the control device 200 retrieves the contents having a contents number "C01", and displays the contents on the display unit 20.

The LED display in the above-mentioned step S607*b* is controlled in accordance with the corresponding LED lighting/flickering pattern upon displaying the contents. Additionally, as to which LED is controlled, a predetermined method may be used, or the control device 200 may determine based upon the product coordinate data base 250 in accordance with the detected product (product code). Moreover, the control device 200 generates an effect sound corresponding to the effect sound number ("P1" in this case) from the speaker (not shown) in accordance with the LED control. Additionally, the LED control signal may be stored in the product related information data base 261 of FIG. 8 in association with the product code, and control information for controlling various other external devices may be stored therein.

Next, the sequence of processes shown in FIG. 7 also execute a step S608 in which when the control device 200 determines in step S604 that the category code is the same as that of the previous product, the continuous pickup count number is updated by counting up the count number of the counter by one, and a step S609 in which it is determined whether or not the counter value updated in the step S608 is a predetermined reference value n (n≥2) or more, and upon determination that it is less than the reference value n (n≥2), the sequence proceeds to the aforementioned step S607.

On the other hand, the sequence of processes shown in FIG. 7 also execute a step S610 in which upon determination in step S609 that the counter value is the reference value or more, the control device 200 determines that the event of continuous pickups occurs, and the sequence proceeds to the event of the continuous pickups (FIG. 10) and returns to the aforementioned step S600.

Figure 10:
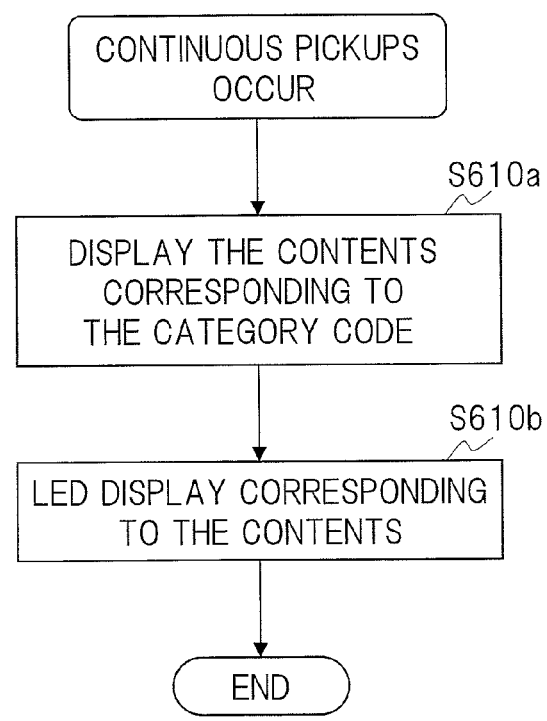
FIG. 10 is a view showing an event process for continuous pickups in the guiding process for products displayed on racks in accordance with the modified example of the present invention.

As shown in FIG. 10, the event of the continuous pickups is that the control device 200 executes a step S610a in which by using the contents number corresponding to the product code of the product retrieved from the product related information data base 261 as a key, the contents from the image data base 270 are displayed, and a step S610b for controlling the LED of the product rack on which the detected product is mounted.

In this manner, based upon the product related information data base 261 shown in FIG. 8, by using the contents number corresponding to the category whose event corresponds to the continuous pickups and whose value has reached the reference value as a key, the control device 200 retrieves the contents from the image data base 270, and displays them on the display unit 20. For example, upon detection of a cleansing material of the category code "001", the control device 200 retrieves the contents (for example, video image concerning how to select a cleansing material) of the contents number "C11" and displays them on the display unit 20. At this time, in the same manner as in the event of the single pickup, the control device 200 carries out the controls of the effect sound and LED.

Additionally, although not shown in FIG. 7, in the case when after the counter for counting the number of continuous pickups has been updated, the next update is not carried out even after a lapse of a predetermined period of time, the control device 200 resets the counter value to 0. Thus, since the counter value is not maintained for a long period of time, it is possible to suppress the counted number based upon the product previously taken out by the customer in the hand from giving influences to service to another customer coming in thereafter, and consequently to provide appropriate service to each of the customers.

Moreover, by installing a human detection sensor (not shown), such as an infrared sensor or the like, in the intelligent rack 100, the counter resetting process may be carried out upon detection by the human detection sensor that the customers have left (no customers have been detected). With this arrangement, the same effects as those of the above-mentioned processes can be obtained.

In this manner, in accordance with another embodiment shown in FIG. 7, the same effects as those of the First Embodiment can be obtained, and when a customer takes a product in the hand, contents relating to the product (for example, introduction to the product and products similar to the corresponding product) can be displayed, and thereafter, when customers have continuously taken products of the same category predetermined times or more (reference value nn−1 times), contents relating to the category (for example, introduction as to how to select the category and other products) can be displayed; thus, it becomes possible to precisely guide products related to the product taken by the customer in the hand, and consequently to promote sales operations.

As described above, in a product display rack system, a product display rack method and a product display rack program in accordance with other embodiments, the present invention includes a product display rack on which a plurality of products, each having an RFID tag attached thereto, are displayed, an RFID reader for detecting an RFID number from the RFID tag of each of the products displayed on the product display rack, a display unit for displaying an image, a product related information data base for storing contents information for each event corresponding to a product type or a product category and a control means for guiding information relating to the product taken by the customer in the hand based upon the detection results of the RFID reader, and the control means carries out a first step for detecting the RFID number of a product taken by a customer in the hand from a desired display rack based upon the detection result of the RFID reader; a second step in which by using the RFID number detected in the first step as a key, a detection is made as to whether or not products having the same category as the category of the product having the above-mentioned RFID number have been taken in the hand predetermined times within a predetermined period of time; a third step in which in accordance with the detection results in the second step, contents information is acquired from the product related information data base; and a fourth step for displaying the contents based upon the contents information acquired in the third step on the display unit, so that information relating to the product taken by a customer in the hand can be guided to the customer and the sales operation can be promoted.

Additionally, in the above-mentioned embodiments, explanations have been given by exemplifying women's skin-care products as products; however, the target products of the present invention are not intended to be limited by these, and any product can be used as the target as long as it has a plurality of product types (category types) having different product purposes and a plurality of functional types for each of individual products, and for example, in the case of image software for use in personal computers, those products having different functional types, such as draw-type image software and vector-type image software of a plurality of makers, may be used as the target.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A product display rack system which displays a plurality of products having a plurality of product types and functional types, each having an RFID tag having a radio communication function for an RFID number attached thereto, and guides a customer toward related products associated with a product taken by the customer in the hand, the system comprising:
   a plurality of product display racks on which the plurality of products with the RFID tags attached thereto are displayed;
   a plurality of RFID readers for detecting the RFID numbers from the RFID tags of the products displayed on the product display racks;
   a lamp guiding unit for guiding the customer to the position of the product displayed on each of the plurality of product display racks by a lighted lamp or a flickering lamp;
   a product related information database in which relations among the product types and functional types of the plurality of products are stored;

a product coordinate database in which product display coordinates for the product display rack for each of the product types are stored; and control means which, based upon the results of detection by the RFID reader, guide the customer toward other products related to the product taken by the customer in the hand, wherein the control means carries out:
- a first step of detecting an RFID number of a product taken by a customer from a desired display rack based upon the detection result of the RFID reader;
- a second step of acquiring RFID numbers of related products having related product types and functional types relative to the product type of the RFID number from the product related information database by using the RFID number detected in the first step as a key;
- a third step of acquiring the product display coordinates of the product type from the product coordinate database by using the RFID number of the related product acquired in the second step as a key; and
- a fourth step of lighting or flickering the lamp of the lamp guiding unit at a position close to the product display coordinates acquired in the third step.

2. The product display rack system according to claim 1, wherein the system further comprises:
an image display unit for displaying an image; and
an image database for storing a commercial image for a product corresponding to an RFID number, and
wherein the control means carries out a fifth step of retrieving the commercial image for the product related to the RFID number from the image database by using the RFID number detected in the first step as a key to display the corresponding image on the image display unit.

3. The product display rack system according to claim 2, wherein when, in the second step, the control means determines that a customer has taken a plurality of products in the hand within a predetermined period of time, the control means carries out a sixth step in which the functional types and series of the plurality of products taken by the customer in the hand are determined, and upon determination that products of the same functional type have been taken in the hand, other products having the same functional type are acquired as the related products, while upon determination that products of the same series have been taken in the hand, other functional-type products in the same series are acquired so that a commercial message sentence relating to each of the related products corresponding to the RFID numbers of the acquired related products is displayed on the image display unit.

4. The product display rack system according to claim 2, wherein the control means carries out a seventh step in which, when a predetermined period of time has elapsed from the start of the lighting or flickering of the lamp in the fourth step, a determination is made as to whether or not the product that has been taken by the customer in the hand has been returned to the product display rack by using the RFID reader, and upon determination that the product has been returned, the RFID numbers and product display coordinates are read from the RFID tags of all the products displayed on the plurality of the product display racks so that the product display coordinates for each of the product types are stored in the product coordinate database.

5. The product display rack system according to claim 1, wherein when, in the second step, the control means determines that a customer has taken a plurality of products in the hand within a predetermined period of time, the control means carries out a sixth step in which the functional types and series of the plurality of products taken by the customer in the hand are determined, and upon determination that products of the same functional type have been taken in the hand, other products having the same functional type are acquired as the related products, while upon determination that products of the same series have been taken in the hand, other functional-type products in the same series are acquired so that a commercial message sentence relating to each of the related products corresponding to the RFID numbers of the acquired related products is displayed on the image display unit.

6. The product display rack system according to claim 5, wherein the control means carries out a seventh step in which, when a predetermined period of time has elapsed from the start of the lighting or flickering of the lamp in the fourth step, a determination is made as to whether or not the product taken by the customer in the hand has been returned to the product display rack by using the RFID reader, and upon determination that the product has been returned, the RFID numbers and product display coordinates are read from the RFID tags of all the products displayed on the plurality of the product display racks so that the product display coordinates for each of the product types are stored in the product coordinate database.

7. The product display rack system according to claim 5, wherein the control means carries out a step in which, upon determination that the product taken by the customer in the hand in the sixth step has not been returned to the product display rack, the lighting or flickering of the lamp in the lamp guiding unit in the fourth step and the image display by the image display unit are stopped.

8. The product display rack system according to claim 1, wherein the control means carries out a seventh step in which, when a predetermined period of time has elapsed from the start of the lighting or flickering of the lamp in the fourth step, a determination is made as to whether or not the product that has been taken by the customer in the hand has been returned to the product display rack by using the RFID reader, and upon determination that the product has been returned, the RFID numbers and product display coordinates are read from the RFID tags of all the products displayed on the plurality of the product display racks so that the product display coordinates for each of the product types are stored in the product coordinate database.

9. A method for controlling a product display rack system which can guide a customer toward other products related to the product taken by the customer in the hand by a computer, the method comprising the steps of:
providing a system comprising:
- a plurality of product display racks on which a plurality of products having a plurality of product types and functional types, each having an RFID tag having a radio communication function for an RFID number attached thereto, are displayed;
- a plurality of RFID readers for detecting the RFID numbers from the RFID tags of the products displayed on the product display racks;
- a lamp guiding unit for guiding the customer to the position of the product displayed on each of the plurality of product display racks by a lighted lamp or a flickering lamp;
- a product related information database in which relations among the product types and functional types of the plurality of products are stored;

a product coordinate database in which product display coordinates for the product display rack for each of the product types are stored; and control means, and controlling the system by the control means based upon the results of detection by the RFID reader, wherein the control means carries out:
- a first step of detecting an RFID number of a product taken by a customer from a desired display rack based upon the detection result of the RFID reader;
- a second step of acquiring RFID numbers of related products having related product types and functional types relative to the product type of the RFID number from the product related information data base by using the RFID number detected in the first step as a key;
- a third step of acquiring the product display coordinates of the product type from the product coordinate data base by using the RFID number of the related product acquired in the second step as a key; and
- a fourth step of lighting or flickering the lamp of the lamp guiding unit at a position close to the product display coordinates acquired in the third step.

10. The method for controlling a product display rack according to claim 9, wherein the control means carries out a sixth step in which, upon determination that a customer has taken a plurality of products in the hand within a predetermined period of time in the second step, the functional types and the series of the plurality of the products taken by the customer in the hand are determined, and upon determination that the customer has taken products of the same functional type, other products of the same functional type are acquired as related products, while upon determination that products of the same series have been taken in the hand, products of another functional type of the same series are acquired so that commercial message sentences in association with the related products corresponding to the acquired related product RFID numbers are displayed on the image display unit.

11. The method for controlling a product display rack according to claim 10, wherein the control means carries out a seventh step in which, when a predetermined period of time has elapsed since the lighting or flickering of a lamp in the fourth step, the control means determines whether or not the product taken by the customer in the hand has been returned to the product display rack by using the RFID reader, and upon determination that the product has been returned, the RFID numbers and the product display coordinates are read from the RFID tags of all the products displayed on the plurality of the product display racks so that the product display coordinates for each of the product types are stored in the product coordinate database.

12. The method for controlling a product display rack according to claim 10, wherein the control means carries out a step in which, upon determination that the product taken by the customer in the hand in the sixth step has not been returned to the product display rack, the lighting or flickering of the lamp in the lamp guiding unit in the fourth step and the image display by the image display unit are stopped.

13. The method for controlling a product display rack according to claim 9, wherein the system further comprises:
- an image display unit for displaying an image; and
- an image database for storing a commercial image of a product corresponding to the RFID number, and wherein the control means carries out a fifth step in which, by using the RFID number detected in the first step as a key, a commercial image for a product corresponding to the RFID number is retrieved from the image database and displayed on the image display unit.

14. The method for controlling a product display rack according to claim 9, wherein the control means carries out a seventh step in which, when a predetermined period of time has elapsed since the lighting or flickering of a lamp in the fourth step, the control means determines whether or not the product taken by the customer in the hand has been returned to the product display rack by using the RFID reader, and upon determination that the product has been returned, the RFID numbers and the product display coordinates are read from the RFID tags of all the products displayed on the plurality of the product display racks so that the product display coordinates for each of the product types are stored in the product coordinate database.

15. A non-transitory, tangible computer-readable medium storing a product display rack program for guiding a customer toward related products associated with a product taken by the customer in the hand, the product display rack program communicating with a computer system, the computer system comprising:
- a plurality of product display racks on which a plurality of products having a plurality of product types and functional types, with RFID tags capable of exerting a radio communication function for RFID numbers being attached thereto, are displayed;
- a plurality of RFID readers for detecting the RFID numbers from the RFID tags of the products displayed on the product display racks;
- a lamp guiding unit for guiding the customer to the product position displayed on each of the plurality of product display racks by a lighted lamp or a flickering lamp;
- a product related information data base in which relationships among the product types and functional types of the plurality of the products are stored;
- a product coordinate database in which product display coordinates for the product display rack for each of the product types are stored; and
- control means which, based upon the results of detection by the RFID reader, guide the customer toward other products related to the product taken by the customer in the hand, wherein the program instructs the control means to:
- perform a first function for detecting an RFID number of a product taken by a customer from a desired display rack based upon the detection result of the RFID reader;
- perform a second function for acquiring RFID numbers of related products having corresponding product types and functional types relative to the product type of the RFID number from the product related information data base by using the RFID number detected in the first function as a key;
- perform a third function for acquiring the product display coordinates of the product type from the product coordinate data base by using the RFID number of the related product acquired in the second function as a key; and
- perform a fourth function for lighting or flickering the lamp of the lamp guiding unit at a position close to the product display coordinates acquired in the third function.

16. The non-transitory, tangible computer-readable medium according to claim 15, wherein the computer system further comprises:
- an image display unit for displaying an image; and
- an image database for storing commercial images of products in association with the RFID numbers, and
- wherein the program instructs the control means to perform a fifth function for retrieving a commercial image for a product corresponding to the RFID number from the image database by using the RFID number detected by the first function as a key so that the resulting image is displayed on the image display unit.

17. The non-transitory, tangible computer-readable medium according to claim 15, wherein the program instructs the control means to perform a sixth function in which, upon determination that in the second function the customer has taken a plurality of products in the hand within a predetermined period of time, the functional types and series of the plurality of the products taken by the customer in the hand are determined, and upon determination that products of the same functional type have been taken in the hand, other products of the same functional type are acquired as the related products, while upon determination that products of the same series have been taken in the hand, products of another functional type of the same series are acquired so that commercial message sentences in association with the related products corresponding to the acquired related product RFID numbers are displayed on the image display unit.

18. The non-transitory, tangible computer-readable medium according to claim 17, wherein the program instructs the control means to perform a seventh function in which, when a predetermined period of time has elapsed since the start of lighting or flickering of the lamp by the fourth function, the control means determines whether or not the product taken by the customer in the hand has been returned to the product display rack by using the RFID reader, and upon determination that the product has been returned, the RFID numbers and the product display coordinates are read from the RFID tags of all the products displayed on the plurality of the product display racks so that the product display coordinates for each of the product types are stored in the product coordinate database.

19. The non-transitory, tangible computer-readable medium according to claim 17, wherein the program instructs the control means to carry out a process in which, upon determination that the product taken by the customer in the hand in the sixth function has not been returned to the product display rack, the lighting or flickering of the lamp in the lamp guiding unit and the image display by the image display unit in the fourth function are stopped.

20. The non-transitory, tangible computer-readable medium according to claim 15, wherein the program instructs the control means to perform a seventh function in which, when a predetermined period of time has elapsed since the start of lighting or flickering of the lamp by the fourth function, the control means determines whether or not the product taken by the customer in the hand has been returned to the product display rack by using the RFID reader, and upon determination that it has been returned, the RFID numbers and the product display coordinates are read from the RFID tags of all the products displayed on the plurality of the product display racks so that the product display coordinates for each of the product types are stored in the product coordinate database.

\* \* \* \* \*